US007287006B1

(12) United States Patent  (10) Patent No.: US 7,287,006 B1
Kratka  (45) Date of Patent: Oct. 23, 2007

(54) RISK-ADJUSTED METHOD FOR PRICING FINANCIAL DERIVATIVES

(76) Inventor: Milan Kratka, 432 Naperville Rd., Clarendon Hills, IL (US) 60514

( * ) Notice: Subject to any disclaimer, the term of this patent is extended or adjusted under 35 U.S.C. 154(b) by 294 days.

(21) Appl. No.: 11/029,281

(22) Filed: Jan. 5, 2005

Related U.S. Application Data

(63) Continuation of application No. 09/283,781, filed on Apr. 1, 1999, now abandoned.

(51) Int. Cl.
*G06Q 40/00* (2006.01)
(52) U.S. Cl. .............................. 705/36; 705/37; 705/8; 705/10; 705/23; 705/35
(58) Field of Classification Search .................. 705/37, 705/36, 38
See application file for complete search history.

(56) References Cited

U.S. PATENT DOCUMENTS

| | | | | |
|---|---|---|---|---|
| 3,634,669 A | * | 1/1972 | Soumas et al. ........... 705/36 R |
| 3,697,693 A | * | 10/1972 | Deschenes et al. ........... 705/38 |
| 4,007,355 A | * | 2/1977 | Moreno ....................... 235/379 |
| 4,334,270 A | * | 6/1982 | Towers ..................... 705/36 R |
| 4,346,442 A | * | 8/1982 | Musmanno ............... 705/36 R |
| 4,376,978 A | * | 3/1983 | Musmanno ............... 705/36 R |
| 4,642,767 A | * | 2/1987 | Lerner ......................... 705/30 |
| 4,722,055 A | * | 1/1988 | Roberts ..................... 705/36 R |
| 4,742,457 A | * | 5/1988 | Leon et al. .................... 705/35 |
| 4,774,663 A | * | 9/1988 | Musmanno et al. ...... 705/36 R |
| 4,868,376 A | * | 9/1989 | Lessin et al. ................ 235/492 |
| 6,021,397 A | * | 2/2000 | Jones et al. ............... 705/36 R |
| 6,061,662 A | * | 5/2000 | Makivic .................... 705/36 R |

OTHER PUBLICATIONS

Polsky Lisa .K, understanding Derivatives, Institutional Investor, New York: 1992. vol. 26, Iss. 13; p. S14, 2 pgs.*
Antonio Marcos Duarte J. Optimal value at risk hedge using stimulation methods, Derivates quarterly, NEW York: Winter 1998. vol. 5, Iss. 2; p. 67; 9 pgs.*

* cited by examiner

*Primary Examiner*—Frantz Poinvil
*Assistant Examiner*—Clement Graham
(74) *Attorney, Agent, or Firm*—James P. Murphy

(57) ABSTRACT

A method and computer apparatus determines the value of a derivative by introducing risk premiums. The method includes determining the underlying security and derivative, determining the risks and trading costs associated with the derivative, formulating the RAP equation for the derivative, solving the RAP equation for the derivative and outputting a value of the derivative based on the solution of the RAP equation. The computer apparatus employs this method in a financial analysis application. The system includes an input unit for taking inputs of derivative characteristics and model parameters, a processing unit for computing a value of the derivative based on the input characteristics and parameters using a risk-adjusted pricing equation, and an output unit for displaying the value of the derivative.

2 Claims, 8 Drawing Sheets

1. Black-Scholes implied volatility

2. Risk-adjusted call price minus Black-Scholes call price

3. Risk-adjusted delta minus Black-Scholes delta

4. Risk-adjusted gamma minus Black-Scholes gamma

Figure 6

```c
#include <math.h>
#include <stdlib.h>
include <iostream.h> define  MAX_TIME_STEPS  200
define  MAX_PRICE_STEPS 200
#define  pi 3.1415962
#define  PUT 'P'
#define  CALL 'C'
define  MAX_GAMMA 128.0 define max(a,b)    (((a) > (b)) ? (a) : (b))
define min(a,b)    (((a) < (b)) ? (a) : (b))

double O[MAX_TIME_STEPS][MAX_PRICE_STEPS]; // array of the option price
double Delta[MAX_TIME_STEPS][MAX_PRICE_STEPS]; // array of deltas
double Gamma[MAX_TIME_STEPS][MAX_PRICE_STEPS]; // array of gammas
double Theta[MAX_TIME_STEPS][MAX_PRICE_STEPS]; // array of thetas
double Vega[MAX_TIME_STEPS][MAX_PRICE_STEPS]; // array of vegas
double M[MAX_TIME_STEPS][MAX_PRICE_STEPS]; // array of the volatility adjustments
int S0;

void RAPoptionEuropean(// option's characteristics:
            double T,   // T is time to maturity in years
            double K,   // K is the strike price in dollars
            double S,   // S is the current underlying price in dollars
            char Y,     // Y is the option type: Put or Call
            // model parameters:
            double sig, // sig is the implied underlying volatility
            double mu,  // expected trend rate
            double R,   // R is the variance risk premium coeff.
            double C,   // c is the transaction costs/slippage coeff.
            double v,   // v is the implied volatility risk premium coeff double g,   // gap risk coeff.
            double r,   // risk free rate
            double rb,  // borrowing fees rate
            double rd,  // dividend yield rate
            // computational parameters:
            int nt,     // number of time steps
            int ns,     // number of price steps
            double ls,  // lower bound on underlying price S
            double us   // upper bound on underlying price S
            ){
    //  DO: initialize the computational variables
    double m1 = pow( 324.0 * R * C * C / pi, 1.0/3.0 ); // m is the risk parameter
    double dt = T / nt;              // time step
    double ds = ( us - ls ) / ns;    // the price step size
    double s[MAX_PRICE_STEPS];       // array of the underlying stock prices
    double s2[MAX_PRICE_STEPS];      // array of squares of the underlying stock prices
    double t[MAX_TIME_STEPS];        // array of the time steps
    double o[MAX_PRICE_STEPS];       // array of the option price
    double delta[MAX_PRICE_STEPS];   // array of deltas
    double gamma[MAX_PRICE_STEPS];   // array of deltas
    double theta[MAX_PRICE_STEPS];   // array of deltas
```

Figure 6 (2 of 5)

```
  double vega[MAX_PRICE_STEPS];    // array of vegas
  double m[MAX_PRICE_STEPS];       // array of the volatility adjustments
  double o_old[MAX_PRICE_STEPS];      // array of old option prices int it;  // an auxiliary index variable
  int is;  // an auxiliary index variable
  double ds2 = ds * ds;
  double a[MAX_PRICE_STEPS]; // array of matrix coefficients
  double b[MAX_PRICE_STEPS]; // array of matrix coefficients
  double c[MAX_PRICE_STEPS]; // array of matrix coefficients
  double d[MAX_PRICE_STEPS]; // array of matrix coefficients
  double aux1, aux2, aux3, aux4, aux5, aux6;

// DO: Make sure that the coefficients are within their meaningfull range
  if( nt > MAX_TIME_STEPS || nt < 1 ) nt = MAX_TIME_STEPS;
  if( ns > MAX_PRICE_STEPS || ns < 1 ) ns = MAX_PRICE_STEPS;
  if( sig < 0.0 ) sig = - sig;  // volatility cannot be negative
  if( R < 0.0 ) R = -R;         // variance risk premium cannot be negative
  if( g < 0.0 ) g = -g;         // gap risk premium cannot be negative
  if( rb < 0.0 ) rb = -rb;      // borrowing fees cannot be nagative
  if( ls < 0.0 ) ls = 0.0;         // underlying price range cannot be negative
  if( us < 0.0 ) us = -us;         // underlying price range cannot be negative
  v = 0.0;  // set the volatility risk premium to zero in this demonstration
 procedure // DO: Set the borrowing rate and dividend rate for puts to zero
  if( Y == PUT ){
    rb = 0.0;
  }

// DO: Initialize the arrays of the time
  for( it = 0; it <= nt; it++ ){
    t[it] = it * dt; // the maturity time T is t[nt], the current time 0 is t[0]
  }

// DO: Initialize the arrays of the price
  is = 0;
  s[0] = S - is * ds;
  while( s[0] >= ls ){
    s[0] = s[0] - ds;
    is++;
  }
  S0 = is - 1;
  s[0] = s[0] + ds;
  for( is = 1; is <= ns; is++ ){
    s[is] = s[is-1] + ds;
  }
  for( is = 0; is <= ns; is++ ){
    s2[is] = s[is] * s[is];  // array of the price squares
  }

// DO: initialize the finite difference scheme by the derivative's values
  //     at maturity time by the payoff function
  if( Y == CALL ){
    for( is = 0; is <= ns; is++ ){
      o[is] = max( 0.0, s[is] - K );   // call option payodeltasff
```

Figure 6 (3 of 5)

```
    if( s[is] < K ){
  delta[is] = 0.0;   // delta zero below the strike
  gamma[is] = 0.0;   // gamma zero
    } else if( s[is] == K ){
  delta[is] = 0.5;   // at the strike delta 0.5 for numerical stability
  gamma[is] = MAX_GAMMA;  // gamma is the maximum allowed by the market
                          // which is inverse of the minimum tick size
    } else if( s[is] > K ){
  delta[is] = 1.0;   // delta one above the strike
  gamma[is] = 0.0;   // gamma zero
    }
    theta[is] = 0.0;   // no time decay left
    vega[is] = 0.0;    // no volatility sensitivity
  }
} else if( Y == PUT ){
  for( is = 0; is <= ns; is++ ){
    o[is] = max( 0.0, K - s[is] );  // put option payoff
    if( s[is] < K ){
  delta[is] = -1.0;  // delta zero below the strike
  gamma[is] = 0.0;   // gamma zero
    } else if( s[is] == K ){
  delta[is] = 0.5;   // at the strike delta 0.5 for numerical stability
  gamma[is] = MAX_GAMMA;  // gamma is the maximum allowed by the market
                          // which is inverse of the minimum tick size
    } else if( s[is] > K ){
  delta[is] = 0.0;   // delta one above the strike
  gamma[is] = 0.0;   // gamma zero
    }
    theta[is] = 0.0;   // no time decay left
    vega[is] = 0.0;    // no volatility sensitivity
  }
} for( is = 0; is <= ns; is++ ){
  if( gamma[is] > 0.0 ){
    m[is] = max( 0.0, 1.0 + g - min( m1 * pow( gamma[is], 1.0/3.0 ),
                  2.0 * R * delta[is] * delta[is] / gamma[is] ) );
  } else {
    m[is] = 1.0 + g;
  }
} for( is = 0; is <= ns; is++ ){
  O[nt][is]     = o[is];
  Delta[nt][is] = delta[is];
  Gamma[nt][is] = gamma[is];
  Theta[nt][is] = theta[is];
  Vega[nt][is]  = vega[is];
}

// DO: remember the last computed values
for( is = 0; is <= ns; is++ ){
  o_old[is]    = o[is];
}

// DO: Setting: starting time is maturity time
it = nt;

// DO: set the auxiliary variables for faster computational speed
```

Figure 6 (4 of 5)

```
auxl = 0.25 * sig * sig * dt / ( ds * ds );
aux2 = 0.25 * ( r - rb - rd ) * dt / ds;
aux3 = 0.5 * r * dt;

// DO: in the loop compute all the optionis prices
while( it >= 0 ){ // INV: new time >= current time it--;  // Meaning: Time := Time - Time Step // DO: compute the solution on the new time level by solving
   //     the RAP equation with the semi-implicit finite difference
   //     Crank-Nicolson scheme method // DO: Initialize the triangular matrix coefficients and the right hand
side
   for( is = 1; is < ns; is++ ){
     // a,b,c are on the diagonal
     aux4 = auxl * s2[is] * m[is];
     aux5 = aux2 * s[is];

a[is] = aux4 - aux5;
     b[is] = -1.0 - 4 * aux4 - aux3;
     c[is] = aux4 + aux5;
     // d is the right hand side
     d[is] = o_old[is-1] * ( - aux4 - aux5 ) + o_old[is] * ( -1 + 4 * aux4
+ aux3 )
            + o_old[is+1] * ( - aux4 + aux5 ) + v * vega[is];
   }

// DO: Initialize the boundary conditions:
   if( Y == CALL ){
     // Call boundary conditions
     b[0] = 1.0;
     c[0] = 0.0;
     d[0] = 0.0;

a[ns] = 0.0;
     b[ns] = 1.0;
     d[ns] = ( s[ns] - K ) * exp( ( r - rd - rb ) * ( T - t[it] ));
   } else if( Y == PUT ){
     // Put boundary conditions
     b[0] = 1.0;
     c[0] = 0.0;
     d[0] = ( K - s[ns] ) * exp( - r * ( T - t[it] ));

a[ns] = 0.0;
     b[ns] = 1.0;
     d[ns] = 0.0;
   }

// DO: Solve the matrix for the new options values
   // DO: run the forward elimination first
   for( is = 1; is < ns; is++ ){
     aux6 = - a[is] / b[is-1];
     b[is] += c[is-1] * aux6;
     d[is] += d[is-1] * aux6;
   }

// DO: run backwards elimination to get the options values
```

```
    o[ns] = d[ns];
    for( is = ns-1; is > 0; is-- ){
      o[is] = ( d[is] - c[is] * o[is+1] ) / b[is];
    }
    o[0] = d[0];

// DO: compute the sensitivities
    for( is = 1; is < ns; is++ ){
      o[is] = max( 0.0, o[is] );   // option value should not be negative
      delta[is] = ( o[is+1] - o[is-1] ) / ( ds + ds );
      gamma[is] = min( MAX_GAMMA,
              max( 0.0, ( o[is+1] - 2 * o[is] + o[is-1] ) / ds2 ) );
      theta[is] = ( o_old[is] - o[is] ) / dt;
      vega[is]  = 0.0;  // in this software vega need not be computed
                        // because we assume v zero if( gamma[is] > 0.0 ){
    m[is] = max( 0.0, 1.0 + g - min( m1 * pow( gamma[is], 1.0/3.0 ),
                  2.0 * R * delta[is] * delta[is] / gamma[is] ) );
      } else {
    m[is] = 1.0 + g;
      }

// DO: save the previous step for the options
      o_old[is] = o[is];
    }

// DO: Save the computed values into the arrays
    for( is = 0; is <= ns; is++ ){
      O[it][is]     = o[is];
      Delta[it][is] = delta[is];
      Gamma[it][is] = gamma[is];
      Theta[it][is] = theta[is];
      Vega[it][is]  = vega[is];
      M[it][is]     = m[is];
    }
  }

// INV: the values have been computed up to the current time

// Return of the computed derivative's values and sensitivities
  // is done throughthe globally defined arrays O, Delta, Gamma, Theta, Vega

… # RISK-ADJUSTED METHOD FOR PRICING FINANCIAL DERIVATIVES

CROSS-REFERENCE TO RELATED APPLICATIONS

This continuation application claims the benefit of U.S. patent application Ser. No. 09/283,781, filed Apr. 1, 1999 now abandoned, entitled "RISK-ADJUSTED METHOD FOR PRICING FINANCIAL DERIVATIVES." The disclosures of U.S. patent application Ser. No. 09/283,781 are hereby incorporated in their entirety.

STATEMENT REGARDING FEDERALLY SPONSORED RESEARCH OR DEVELOPMENT

Not Applicable.

REFERENCE TO MATERIALS ON COMPACT DISC

Not Applicable.

BACKGROUND OF THE INVENTION

This invention relates to methods and apparatus for pricing financial derivatives.

Current pricing models for financial derivatives are based on two pricing methods: (1) the "Classic Arbitrage Argument" (CAA), or (2) "Monte-Carlo" method. The CAA states the return on a perfectly-hedged investment portfolio is precisely equal to the return on U.S. Treasury bonds. Under the CAA method, it is assumed that investors are capable of continuously hedging their portfolios in infinitesimal increments with no costs. Moreover, the CAA method assumes that the parameters of the model do not change during the lifetime of the portfolio and that the markets will always precisely follow the pricing model.

Pricing models based on the CAA method are often referred to as "Risk Neutral Pricing" (RNP) models, because no risks are assumed by the CAA method. Under the CAA method, management of all risks and all discrepancies between the pricing model and the real market is passed to the human users of the model. RNP models are implemented for production in a form of numerical solutions to partial differential equations via finite difference schemes, finite element methods, closed form formulas, or by various tree type methods, including binomial and trinomial ones. For example, the Black-Scholes pricing method is an example of a method that is based on the CAA method and idealistic RNP assumptions.

Monte Carlo pricing models, on the other hand, are based on statistical and probabilistic evaluation of possible future price scenarios. These scenarios are typically generated with the aid of random number generators. Evaluation of derivative prices is modeled via the CAA, discounted payoff method, or a combination of both. In either case, the value of the risk does not explicitly enter the evaluation formula.

Therefore, RNP pricing models do not include market risks and costs in the valuation of a financial derivative. As a result, these pricing models generate valuations of financial derivatives that are not completely consistent with actual market behavior. Although the risks have been reflected in the market prices by various non-mathematical methods, the lack of appropriate mathematical modeling has precluded the explicit inclusion of risks into these pricing and hedging models.

BRIEF SUMMARY OF THE INVENTION

The present invention overcomes the limitation of the prior art by introducing the risk premiums into a pricing model for calculating values of derivative securities.

It is an object of the present invention to provide a pricing model for calculating values of derivative securities that consider various risk premiums.

It is a further object of the present invention to provide a pricing model for calculating values of derivative securities that is consistent with market behavior.

One or more of the foregoing objects are met in whole or in part by the present risk-adjusted pricing method and computer apparatus. The method includes determining the underlying security and derivative, determining the risks and trading costs associated with the derivative, formulating the RAP equation for the derivative, solving the RAP equation for the derivative and outputting a value of the derivative based on the solution of the RAP equation. The computer apparatus employs this method in a financial analysis application. The system includes an input unit for taking inputs of derivative characteristics and model parameters, a processing unit for computing a value of the derivative based on the input characteristics and parameters using a risk-adjusted pricing equation, and an output unit for displaying the value of the derivative.

BRIEF DESCRIPTION OF THE DRAWINGS

FIG. 6 is the source code of a preferred embodiment of the RAP evaluation software written in C/C++ language.

DETAILED DESCRIPTION OF THE INVENTION

Figure 1:
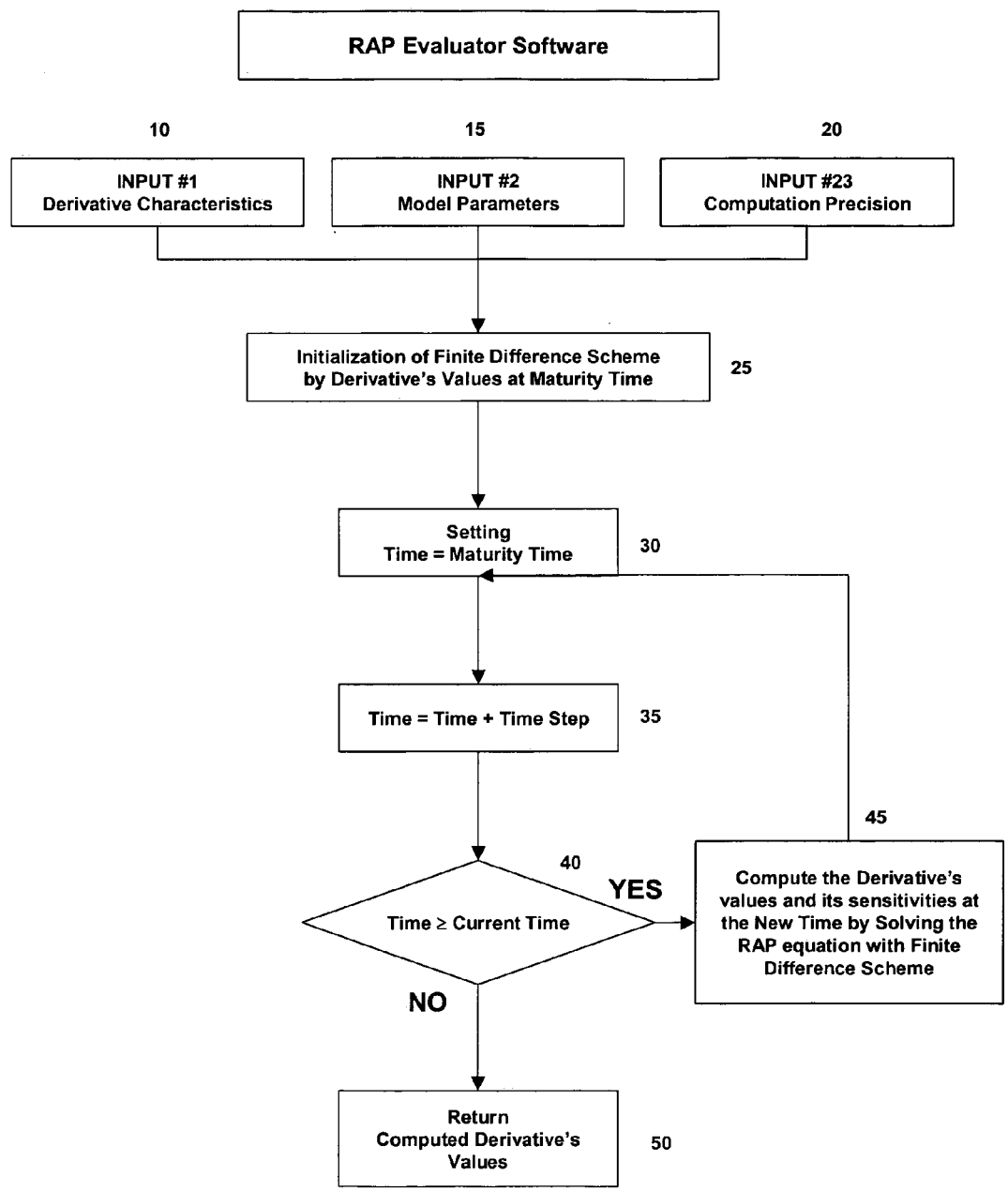
FIG. 1 is a flowchart of a preferred embodiment of the RAP evaluation software.
Figure 2:
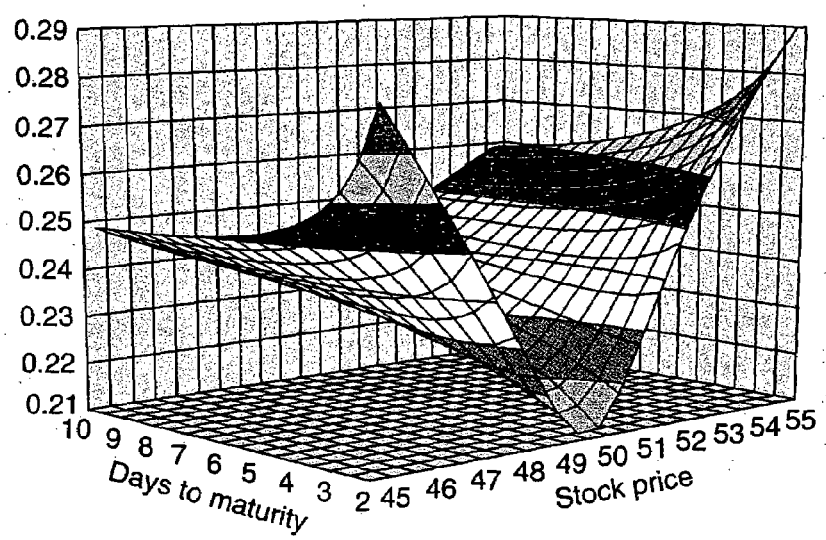
FIG. 2 is an output generated by use of a preferred embodiment of the RAP evaluation software that describes the Black-Scholes implied volatility.
Figure 3:
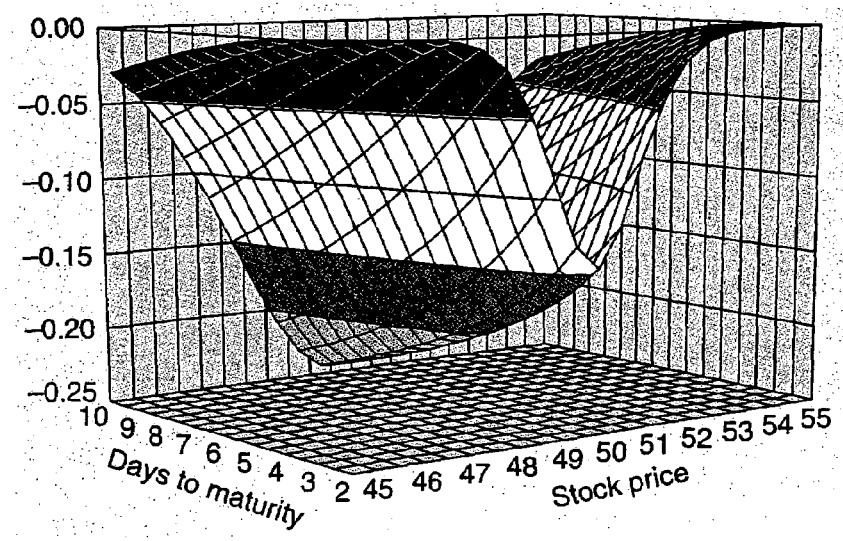
FIG. 3 is an output generated by use of a preferred embodiment of the RAP evaluation software that describes the difference between the Black-Scholes call price and the risk-adjusted call price.
Figure 4:
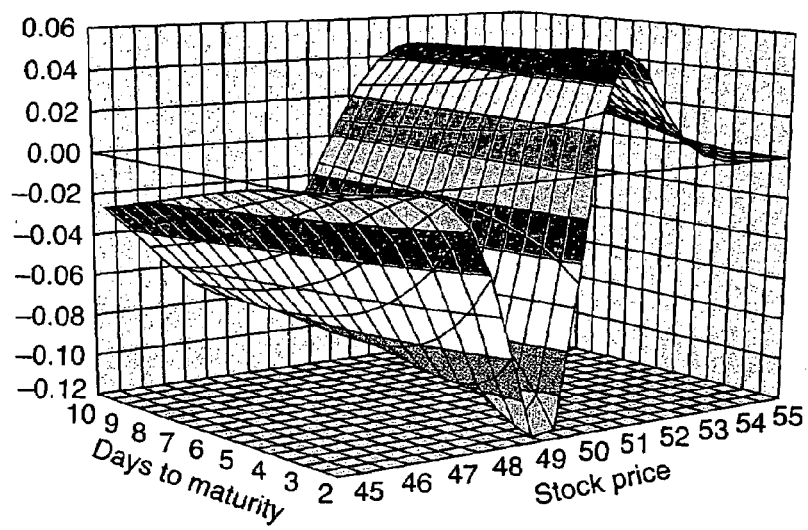
FIG. 4 is an output generated by use of a preferred embodiment of the RAP evaluation software that describes the difference between the Black-Scholes delta and the risk-adjusted delta.
Figure 5:
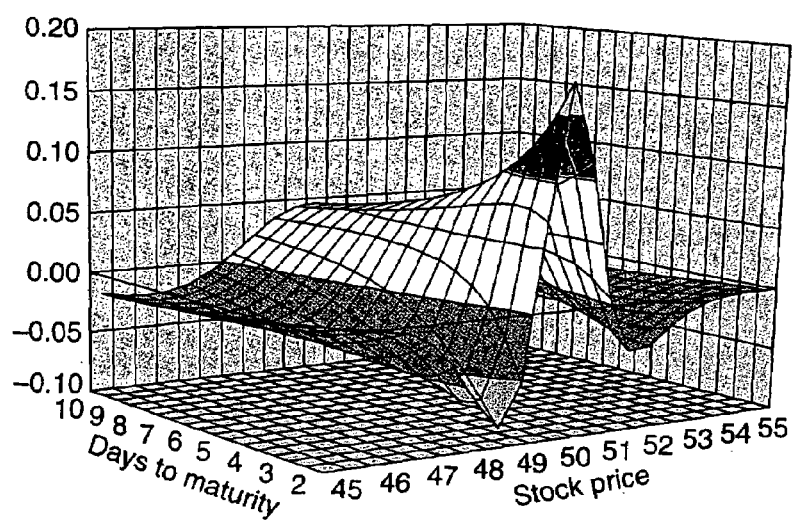
FIG. 5 is an output generated by use of a preferred embodiment of the RAP evaluation software that describes the difference between the Black-Scholes gamma and the risk-adjusted gamma.

The present invention overcomes the limitation of the prior art by introducing the risk premiums into a pricing model for calculating values of derivative securities. A derivative security is a security that derives its value from another underlying security, commodity, or object. Derivative securities include futures, forwards, options on stock, options on index, options on futures, basket options, swaps, swaptions, and others.

Contrary to the current RNP models based on the CAA or Monte-Carlo, the present invention is based on the Advanced Arbitrage Argument (AAA), which incorporates the value of the various risks associated with derivatives into the valuation of those derivatives. The AAA states that the expected return on an investment should not only equal the return on the U.S. government bonds (as assumed by CAA), but should also include expected investment costs (such as ask bid spreads, brokerage fees, borrowing fees, etc.) and premiums for taking investment risks (such as implied volatility risk, positive portfolio variance risk, price gap risk, etc.). The AAA can be summarized by the following template pricing equation, which is valid at any step of time during the life of an investment:

$$\begin{array}{c}\text{Expected Return}\\\text{on}\\\text{Investment}\end{array} = \begin{array}{c}\text{Return}\\\text{on}\\\text{Government Bonds}\end{array} + \begin{array}{c}\text{Rate of Expected}\\\text{Investment}\\\text{Costs}\end{array} + \begin{array}{c}\text{Rate of Expected}\\\text{Risk}\\\text{Premium}\end{array} \quad (1)$$

Return on government bonds is often referred to as the "risk-free rate." Expected risk premium compensates the investor for taking an exposure to various risks associated with the investment, similar in function and form to insurance premiums. The present invention implements the AAA through Risk Adjusted Pricing (RAP) methodology, which provides a means to quantitatively enumerate individual risk premiums into the pricing equation.

Because the AAA is valid at any step of time during the life of an investment, the RAP methodology can formulate the expected return on investment, rate of expected investment costs, and the rate of expected risk premiums at any given time in the future as a function of price, time, sensitivity, and other parameters.

Suppose that an investor prices an option O on an underlying security S, which follows the typical lognormal process with the drift (or the trend) $\mu$ and the volatility $\sigma$:

$$dS = \mu S dt + \sigma S d\tilde{z} \quad (2)$$

Here the term dt represents a small increment of time, $d\tilde{z}$ represents a normalized stochastic process, and dS represents a change of the price of the underlying security over this time interval dt. By forming a portfolio P consisting of a unit of the option O and $-\delta$ units of the underlying security S, the portfolio P can be expressed as $$P = O - \delta S \quad (3)$$

and is subject to the AAA. The amount $\delta$ (delta) is usually called the hedge.

In the current RNP models, this portfolio's delta is adjusted continuously and without costs. In the present invention, however, it may be adjusted at discrete steps of time based on a re-hedging strategy of portfolio P. Though transaction costs occur at these discrete steps of time, the present invention spreads the costs over the entire time interval between re-hedging points, similar to the customary practice with the dividend rate, thus defining a rate of transaction costs, $r_{TC}$. These costs may include, but are not limited to, ask bid spread, slippage, brokerage and exchange fees, short sales taxes, etc. There may be other trading costs associated with the maintenance of the portfolio. For example, short-selling of $\delta$ units of stock accrues fees for borrowing the stock in a rate $r_B$, resulting in a cost $r_B \delta$ Sdt over a small time interval dt. Similarly, a short position in a dividend paying stock or an index with dividend yield $r_D$ results in the costs $r_D \delta$ Sdt over a small time interval dt.

The invested amount in this portfolio could have been invested in the government bonds resulting in a riskless return r. For portfolio P consisting of $\delta$ units of stock S and option O on this stock, this amount may be equal to $O - \delta S$. For portfolio P consisting of $\delta$ units of futures S and an option O on this futures, this amount may be equal to just O. Because the portfolio P cannot be hedged continuously, its value has positive variance, and thus cannot be considered riskless. It is subject to the positive variance risk: the higher the portfolio variance the higher the risk. The investment should thus generate a risk premium $r_{VAR}$ proportional to this variance risk.

Besides the positive variance risk, the investment is also exposed to risks that the market will not follow our assumptions. A possibility of an option price O jump without a change in the underlying value S generates implied volatility risk. The investment should thus generate a risk premium rate $r_\sigma$ proportional to this implied volatility risk. A possibility of a price gap in the underlying security S generates the gap risk. The investment should therefore generate a risk premium rate $r_{GAP}$ proportional to this gap risk. In the presence of other considered risks, for instance: credit risks, interest rate risks, liquidity risks, daily price limit risks, etc., we would include the corresponding risk premiums. The value of the risk premium is not restricted to the positive values. A negative risk premium corresponds to a negative risk exposure.

In the present invention, the expected return E[dP] on the investment in the portfolio P over a short time interval dt can be expressed as:

$$E[dP] = E[dO - \delta dS] \quad (4)$$

Following the AAA the "Risk-Adjusted Pricing" (RAP) template equation for an option on a stock or an index S is:

$$E[dO - \delta dS] = [r(O - \delta S)dt] + [r_{TC}dt + r_B \delta Sdt + r_D \delta Sdt] + [r_{VAR}dt + r_\sigma dt + r_{GAP}dt], \quad (5)$$

where the rate of borrowing fees $r_B$ and the dividend yield $r_D$ are zero for negative values of $\delta$. Similarly, the RAP template equation for an option on a futures contract S can be written as:

$$E[dO - \delta dS] = [rOdt] + [r_{TC}dt] + [r_{VAR}dt + r_\sigma dt + r_{GAP}dt]. \quad (6)$$

From the assumption about the underlying security price process: $dS = \mu Sdt + \sigma Sd\tilde{z}$ and from the Itô's lemma of stochastic calculus, the stochastic differential equation is:

$$dO = \partial_t Odt + \tfrac{1}{2}\sigma^2 S^2 \partial_{SS}^2 Odt + \partial_S OdS \quad (7)$$

Re-hedging of the portfolio P over a time interval dt to the value $\delta = \partial_S O$ makes the expected value of $E[dO - \delta dS]$ equal to:

$$E[\partial_t Odt + \tfrac{1}{2}\sigma^2 S^2 \partial_{SS}^2 Odt + \partial_S OdS - \delta dS] = \partial_t Odt + \tfrac{1}{2}\sigma^2 S^2 \partial_{SS}^2 Odt, \quad (8)$$

and at the same time it minimizes the variance of the portfolio. Re-hedging consistently to a different delta $\delta$ would make the expectation term $E[dO - \delta dS]$ equal to:

$$\partial_t Odt + \tfrac{1}{2}\sigma^2 S^2 \partial_{SS}^2 Odt + (\partial_S O - \delta)\mu Sdt, \quad (9)$$

and it would increase the portfolio variance by $(\partial_S O - \delta)^2 \sigma^2 S^2 dt$. For investors with strong trend expectations, it is thus optimal to re-hedge to a trend-adjusted delta that differs from the value $\partial_S O$.

In general, it is difficult to estimate the future trend term $\mu$ from the market. It is a subjective issue. If the trend was known in advance and had a significant value, the underlying price would have been already adjusted accordingly.

There is much uncertainty about trends. Each time somebody buys a security, there is somebody who sells it. Similarly, some investors might under-hedge, while others might over-hedge. For the pricing purposes we could assume that the portfolio P is being hedged with the delta given by the value $\partial_S O$.

The rate of the transaction costs $r_{TC}$ related to the re-hedging of the portfolio typically depend on the momentary market conditions that include the size of the ask bid spread, liquidity of the market, and size of the trade. Since large orders tend to move the market, typically the transaction costs per unit contract will be a non-increasing function of the total size of the trade. If the function C denotes an aggregate trading cost per contract as a function of the trading size for the individual market, then the rate of the transaction costs between two re-hedging points over the time interval $\Delta_t$ can be estimated as:

$$r_{TC} = \frac{C(N|\Delta\delta|)\Delta\delta}{\Delta_t}, \quad (10)$$

where the expected actual size $E[\Delta\delta]$ of the re-hedging trade, i.e. the number of traded units of the security S, is given by the formula:

$$E[|\Delta\delta|] \cong \sqrt{\frac{2}{\pi}} \sigma S|\Gamma| \frac{1}{\sqrt{\Delta_t}}, \quad (11)$$

that can be found in the article by Milan Kratka, RISK, April 1998, at 67–71, which is herein incorporated by reference in its entirety. Assuming that the prevailing rate of transaction costs in the market is constant, in the present invention the rate of the transaction cost is equal to:

$$r_{TC} = C\sqrt{\frac{2}{\pi}} \sigma S|\Gamma| \frac{1}{\sqrt{\Delta_t}}. \quad (12)$$

Notably, the longer the time between re-hedging $\Delta_t$, the lower the trading costs rate $r_{TC}$.

To estimate the rate of the risk premium $r_{VAR}$ compensating the investor for taking the positive variance risk, note that the higher the variance the higher the risk premium. A variance of a normal process increases linearly in time, and the rate of variance risk premium can be modeled by a linear function of the portfolio variance:

$$r_{VAR}\Delta_t = R \cdot var(\Delta P), \quad (13)$$

where R is the variance risk coefficient, which can also be viewed as a risk aversion coefficient. The higher it is, the more risk premium should be collected for the variance risk. The variance of the portfolio $var(\Delta P)$ between two re-hedging points with rehedging to $\partial_S O$ over an interval $\Delta_t$ can be mathematically estimated as:

$$var(\Delta P) \cong 3\sigma^4 S^4 \Gamma^2 \Delta_t^2, \quad (14)$$

where $\Gamma = \partial_{SS}^2 O$ as it is standard in the industry. Since the adjustment to the portfolio is done in discrete steps, measure of the variance of the portfolio between adjustment may be subject to a definition discussion. Nevertheless, the dimensional analysis of the expected formula for the variance confirms the proportionality of the variance to $\sigma^4 S^4 \Gamma^2 \Delta_t^2$. Therefore in the present invention the rate of the variance risk premium is:

$$r_{VAR} = 3R\sigma^4 S^4 \Gamma^2 \Delta_t. \quad (15)$$

Notably, the longer the time between re-hedging $\Delta_t$, the higher the variance, and the higher the rate of the variance risk premium $r_{VAR}$. Since the variance of the hedged portfolio P should be less than a variance of its individual components, an upper bound for the variance risk premium from the variance of the underlying security is:

$$r_{VAR} \leq R\delta^2 \sigma^2 S^2. \quad (16)$$

This estimate is actual typically close to expiration of the option O, when $\Gamma$ becomes large.

The risk premium related to the implied volatility risk exposure depends on a probability that the implied volatility $\sigma$ may change, and it depends on the sensitivity of the portfolio value to this volatility change. The sensitivity of the portfolio value P to the change in $\sigma$ is equal the sensitivity of the option value O to the change in $\sigma$. Thus, in the present invention, the implied volatility risk premium rate as:

$$r_\sigma = v \partial_\sigma O, \quad (17)$$

where $v$ is the coefficient of dependency.

The risk premium $r_{GAP}$ for the underlying price gap exposure should be proportional to the probability of the price gap, as well as to the size of the price gap. Due to the Itô's lemma, the change of the portfolio value due to the price gap $\Delta S$ is equal to:

$$\Delta P = \frac{1}{2}\Gamma(\Delta S)^2, \quad (18)$$

the gap risk premium can be modeled as:

$$r_{GAP} = g\frac{1}{2}\sigma^2 S^2 \Gamma, \quad (19)$$

where the expected price gap size is scaled.

If the financial markets are efficient, then the market pricing will reflect the market value of risk, average prevailing trading costs, as well as competitive re-hedging strategies. There is never a guarantee that the free market will value options in any particular way. But we can assume that it does, build a pricing model and use it to verify our assumptions. The optimal re-hedging strategy in the market dictates minimization of the transaction costs $r_{TC}$ and the premium for the positive portfolio variance $r_{VAR}$. This leads to a simple algebraic optimization task yielding the solution in terms of optimal re-hedging time interval:

$$\Delta_t = \frac{k^2}{\sigma^2 S^2 \Gamma^{\frac{2}{3}}}, \quad (20)$$

where the coefficient $k = (C/3R\sqrt{2\pi})^{1/3}$. This optimal re-hedging time interval corresponds to an optimal re-hedging strategy defined by re-hedging with every change of:

$$\Delta_S = \pm \sigma S\sqrt{\Delta_t} = \pm k \cdot \Gamma^{-1/3} \quad (21)$$

in the underlying security S.

This optimal strategy balances prevailing trading costs $r_{TC}$ against the positive variance risk premium rate $r_{VAR}$. Taking into account that the variance estimate is bounded from above by the variance of the underlying security component of the portfolio, in the present invention the quantitative enumeration of all individual components in the template RAP equation for the option on a stock or an index can be summarized as:

$$\Theta + \tfrac{1}{2}\sigma^2 S^2 \Gamma M = r(O - \delta S) + (r_B + r_D)\delta S + \nu V, \quad (22)$$

where the RAP volatility adjustment coefficient is denoted by:

$$M = 1 + g - \min(m\Gamma^{1/3}, 2R\delta^2\Gamma^{-1}) \quad (23)$$

the time decay sensitivity theta is denoted by $$\Theta = \frac{\partial O}{\partial t},$$

the hedging sensitivity delta by $$\delta = \frac{\partial O}{\partial S},$$

the gamma sensitivity $$\Gamma = \frac{\partial^2 O}{\partial S^2},$$

and volatility sensitivity by vega by $$V = \frac{\partial O}{\partial \sigma}.$$

The coefficient M shall always be positive to preserve the phenomenological interpretation of the RAP equation. Note that the borrowing fees rate $r_B$ is zero when delta is negative. Similarly, in the present invention, the RAP equation for the option on a futures contracts can be written as:

$$\Theta + \tfrac{1}{2}\sigma^2 S^2 \Gamma M = rO + \nu V. \quad (24)$$

These RAP equations are partial differential equations that can be solved by using various available numerical methods. These RAP equations are typically coupled by so called boundary conditions. These boundary conditions usually arise as a result of the option specifications. Similarly, numerical methods are used for handling extra conditions that arise from the options specifications. For instance when dealing with an early exercise, the numerical solution to the RAP equation will make sure that the value of the option at any particular time does not fall below its exercise value during typical market conditions.

The model coefficients in the RAP equations, such as r, σ, or m, do not need to be constant, but for instance they may be functions of the time t. The RAP methodology includes as a special case the idealistic RNP models. For example, if the possibility of continuous costless hedging without presence of any risks is assumed, the AAA becomes same as the CAA, and the RAP model becomes identical to the Black-Scholes model. On the other hand, the phenomenological explanation and tangible modeling of individual risks and costs included in the RAP methodology allows the RAP models to better explain market pricing even in changing or volatile market environment. The RAP methodology offers not only more precise derivatives pricing tools, but also offers more advanced risk management tools through its computation of the derivatives sensitivities. The RAP methodology offers a direct way to extract more specific information about value of the market risks and prevailing costs via the inverse problem of fitting the RAP model parameters with sufficient amount of the market data, which can be very useful for the better risk monitoring and portfolio management.

FIG. 1 shows a flow chart of the preferred embodiment of RAP evaluation software that computes the value of the derivative by solving the respective RAP equation for that particular derivative. At block 10, derivative characteristics are input for the particular derivative whose value is being calculated. For example, if the derivative is an option, the derivative characteristics may include the type of the option (vanilla puts or calls, spreads, or exotics), the payoff profile, time to expiration, and early exercise feature (American, where the right to exercise the option applies at any point in time until maturity of the option, European, where the right to exercise the option applies only at maturity of the option, or Bermudian, where the right to exercise the option applies only at specific points in time). These characteristics are input manually by the user or automatically by an application software, such as Infinity™, PCQuote™, or Micro-Hedge™.

At block 15, model parameters, like derivative characteristics, are input manually by the user or automatically by application software. In contrast to derivative characteristics, which describe the particular derivative, model parameters describe the behavior of that particular derivative in given markets (equity market, interest rate market, commodity market, foreign exchange market, etc.). For an option, the model parameters could include volatility, risk premium coefficients, trading costs, and risk-free rate.

At block 20, the computation precision is established by setting the resolution in terms of the number of time-steps from the maturity time to the current time, and the number of price-steps and the lower and upper bounds for the underlying price. The lower the resolution, the faster the computation. The higher the resolution, the more precise the computation. These functions described in blocks 10, 15, and 20 can be implemented as an input unit.

Once the derivative characteristics, model parameters, and computation precision are input, the value of the derivative at maturity is initialized by the payoff function of this derivative at block 25. For example, the payoff function of the plain vanilla call option is equal to the maximum value of zero and the difference between the underlying security price at the maturity time and the strike price of the call option. By initializing the value of the derivative at maturity, this necessarily establishes the maturity time at block 30, which is subsequently used in block 35 with the input time-step from block 20 to establish the new time at which the value of the derivative will be computed using the RAP equation for that specific derivative. In block 40, the new time is compared to the current time, and if the new time is greater than or equal to the current time, then the value of the derivative is calculated in block 45 at the new time using the RAP equation for that respective derivative.

After the value of the derivative is calculated, the software returns to block 35 to calculate a new time. That new time is then again compared to the current time in block 40 as explained above. When the new time is less than the current time, the value of the derivative is computed up to the current time and displayed as an output at 50. The functions described in blocks 25, 30, 35, 40, and 45 can be implemented as a processing module and block 50 can be implemented as an output unit.

In block 45, in the preferred embodiment, the RAP equation is solved by the semi-implicit Crank-Nicolson finite difference scheme with the explicit method used for the nonlinear terms in the RAP equation. The RAP equation may be solved also by using other finite difference schemes, finite element, Runge-Kutta ordinary differential equations, or other numerical methods. In block 45, not only are the derivative's values computed, but also its partial derivatives.

FIG. 6 shows the source code for a preferred embodiment of the RAP evaluation software, herein incorporated by reference. The software is useful for evaluating and pricing financial derivatives with use of a computer or any other electronic calculation aid and allows entry by a user of various inputs, while producing a tangible price output. Some preferred outputs of such a device include a discrete price or value of a derivative, graphical representations of price, as shown in FIGS. 2–5, and reports of values of derivatives. Of course, the output can be modified, added to, or supplemented in myriad ways depending on the user's preferences. Further, as stated above, the method and device of the present invention allows the user to input discrete risk factors and utilize those risk factors in any ways preferred by the user to produce the above-mentioned results.

The graphical representations shown in FIGS. 2–5 can be generated by using the values calculated for the derivative by the solution of the RAP equation and entering the values into a commercial graphing package, such as Microsoft™ EXCEL™.

With reference to FIG. 6, an exemplary computer code listing has been provided commensurate with the disclosed invention. The source code listing of FIG. 6 is written in C/C++ and is best utilized with respect to a call or put security based on a European variety option. The code computes the value of a security based on a time reference as shown in the flow chart of FIG. 1, above. The computer code can be run on any well known computer system as is well known to those of ordinary skill in the art. The code first requests the following inputs: 1) T, time to maturity in years; 2) K, strike price in dollars; 3) S, current price of the underlying security in dollars; 4) Y, option type (put or call); 5) sig, implied underlying volatility; 6) mu, expected trend rate; 7) r, variance risk premium; 8) c, trading cost/slippage coefficient; 9) v, volatility risk premium coefficient; 10) g, gap risk coefficient; 11) r, risk free rate; 12) rb, borrowing fees rate; 13) rd, dividend yield rate; 14) nt, number of time steps; 15) ns, number of price steps; 16) 1s, lower bound of underlying price; and 17) us, upper bound of underlying price. The program initializes the variables, and creates the appropriate array of matrix coefficients. The program then verifies that the coefficients are within their normal ranges. The program then processes the variables and numerical inputs using the RAP method, as stated in the comments in the program itself, as shown. The program then stores the two-dimensional array as computed, and produces a value of the security. The program steps also compute and produce required theoretical values of securities in real time, and display or report on the same. Further, use of the computer program model and steps allow real-time reporting and monitoring of the value of the underlying risks, to extract the value of the risk embedded in the security, to generate and display a delta hedging parameter (sensitivity of the option value to change in the value of the underlying security), as well as other potential numbers or reports. Further, use of the direct outputs can be made utilizing standard software tools, like Microsoft™ EXCEL™, to produce graphical representations of risk and value utilizing other models. Some examples of such are shown in FIGS. 2 through 5. These graphs were produced by inputting the values derived with the RAP methodology into Excel, with the desired values for the axes as shown, and running the graph routines having the shown data. As can be imagined, the reports, graphs, and other results are limited only by the requirements of the user.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

The invention claimed is:

1. A risk-adjusted pricing method for calculating the value of a derivative:
   a. determining an underlying security;
   b. determining the type of derivative;
   c. determining risks associated with said derivative;
   d. determining trading costs associated with said derivative;
   e. formulating a risk-adjusted pricing (RAP) equation with multiple parameters of the format:

$$\text{Expected Return On Investment} = \text{Return on Government Bonds} + \text{Rate of Expected Investment Cost} + \text{Rate of Expected Risk Premium}$$

for said derivative comprising one of the following formulas $$E[dO-\delta dS] = [r(O-\delta S)dt] + [r_{TC}dt + r_B \delta Sdt + r_D \delta Sdt] + [r_{VAR}dt + r_\sigma dt + r_{GAP}dt] \quad (i)$$

or $$E[dO-\delta dS] = [rOdt] + [r_{TC}dt] + [r_{VAR}dt + r_\sigma dt + r_{GAP}dt] \quad (ii)$$

where
   $E[dO-\delta dS]$ represents Expected Return On Investment comprising the derivative O hedged with $\delta$ units of the underlying security S over a time interval dt;
   $[r(O-\delta S)dt]$ and $[rOdt]$ represent Return On Government Bonds with rate r;
   $[r_{TC}dt + r_B \delta Sdt + r_D \delta Sdt]$ and $[r_{TC}dt]$ represent Rate of Expected Investment Cost comprising average rate of trading costs $r_{TC}$, borrowing fees $r_B$, and dividend rate $r_D$; and
   $[r_{VAR}dt + r_\sigma dt + r_{GAP}dt]$ represents Rate of Expected Risk Premium comprising average positive variance risk premium rate $r_{VAR}$, volatility risk premium rate $r_\sigma$, and underlying price gap risk premium rate $r_{GAP}$;
   f. inputting said parameters of the RAP equation into a computer and solving said RAP equation with said computer for said derivative using numerical methods; and
   g. outputting a value for said derivative based on said solving of said RAP equation.

2. A computer apparatus for calculating values of derivative securities comprising:

a. an input unit taking inputs of derivative characteristics and model parameters;

b. a processing unit using said inputs to compute a value for a derivative based on at least one of said inputs using a risk-adjusted pricing equation having multiple variable parameters of the format:

Expected Return On Investment = Return on Government Bonds + Rate of Expected Investment Cost + Rate of Expected Risk Premium comprising one of the following formulas $$E[dO-\delta dS]=[r(O-\delta S)dt]+[r_{TC}dt+r_B \delta Sdt+r_D \delta Sdt]+[r_{VAR}dt+r_o dt+r_{GAP}dt] \quad (i)$$

or $$E[dO-\delta dS]=[rOdt]+[r_{TC}dt]+[r_{VAR}dt+r_o dt+r_{GAP}dt] \quad (ii)$$

where $E[dO-\delta dS]$ represents Expected Return On Investment comprising the derivative O hedged with $\delta$ units of the underlying S over a time interval dt;

$[r(O-\delta S)dt]$ and $[rOdt]$ represent Return On Government Bonds with rate r;

$[r_{TC}dt+r_B \delta Sdt+r_D \delta Sdt]$ and $[r_{TC}dt]$ represent Rate of Expected Investment Cost comprising average rate of trading costs $r_{TC}$, borrowing fees $r_B$, and dividend rate $r_D$;

$[r_{VAR}dt+r_o dt+r_{GAP}dt]$ represents Rate of Expected Risk Premium comprising average positive variance risk premium rate $r_{VAR}$, volatility risk premium rate $r_o$, and underlying price gap risk premium rate $r_{GAP}$;

and c. an output unit for displaying a calculated value of said derivative.

* * * * *

UNITED STATES PATENT AND TRADEMARK OFFICE
CERTIFICATE OF CORRECTION

| | | |
|---|---|---|
| PATENT NO. | : 7,287,006 B1 | Page 1 of 1 |
| APPLICATION NO. | : 11/029281 | |
| DATED | : October 23, 2007 | |
| INVENTOR(S) | : Milan Kratka | |

It is certified that error appears in the above-identified patent and that said Letters Patent is hereby corrected as shown below:

In Claim 1, at col. 10, line 19, please insert --comprising-- after "derivative".

Signed and Sealed this

Twentieth Day of May, 2008

JON W. DUDAS
*Director of the United States Patent and Trademark Office*